UNITED STATES PATENT OFFICE.

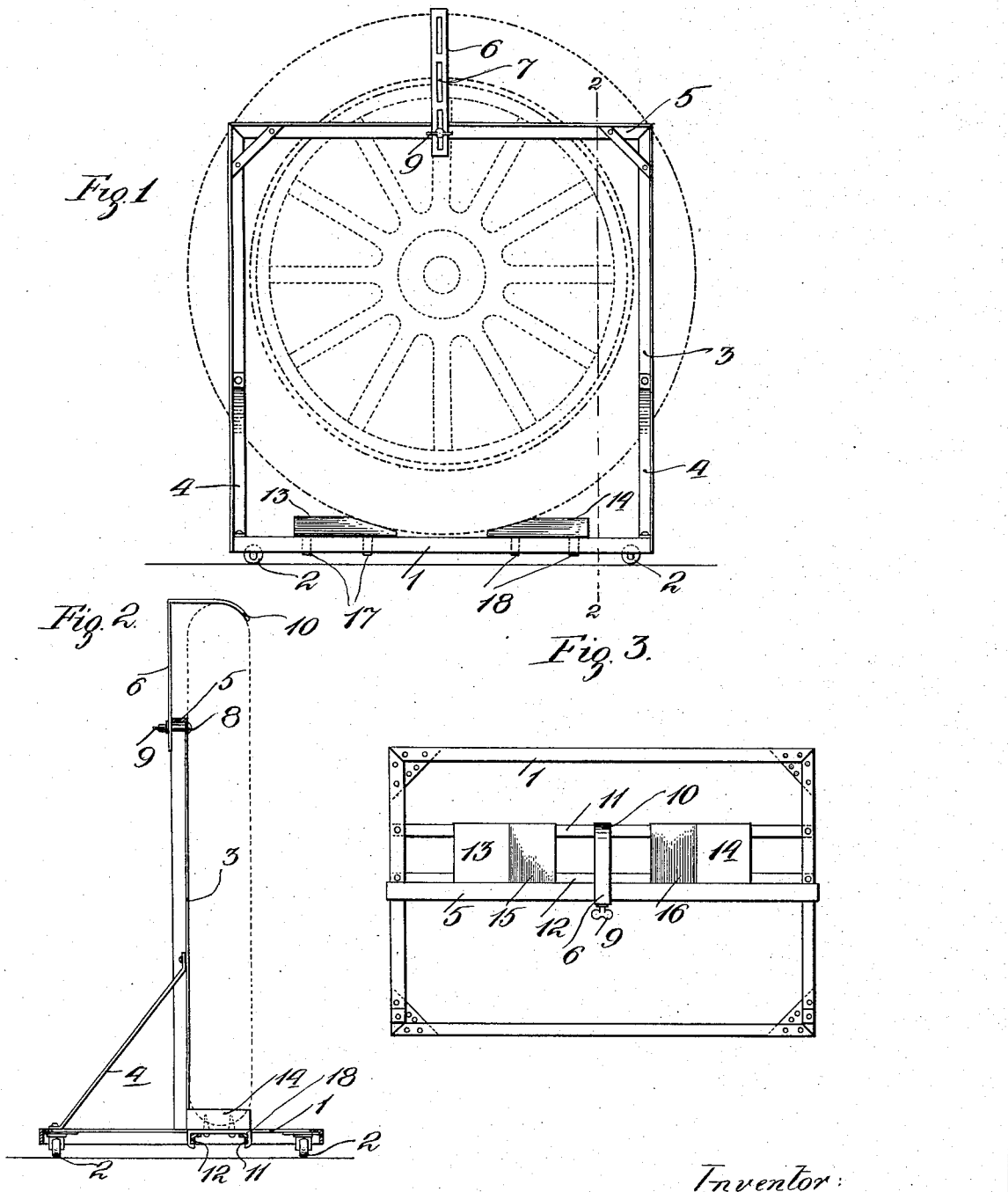

HARVEY P. SIBERELL, OF GLENDALE, CALIFORNIA.

WHEEL-TRUCK.

1,171,807.   Specification of Letters Patent.   Patented Feb. 15, 1916.

Application filed July 19, 1915. Serial No. 40,798.

*To all whom it may concern:*

Be it known that I, HARVEY P. SIBERELL, a citizen of the United States, residing at Glendale, in the county of Los Angeles and State of California, have invented a certain new and useful Wheel-Truck, of which the following is a specification.

My invention relates to a device for supporting wheels and has particular reference to a wheel truck, an object of my invention being to provide a simple and economical truck on which a wheel may be supported in its vertical position and moved about in such position, whereby the center of the wheel relatively to the axle from which it has been removed remains unchanged, hence facilitating the replacement of the wheel.

These and other objects are accomplished by the truck described in the subjoined specification, in connection with the accompanying drawing, in which, Figure 1, is a rear view. Fig. 2, is a section on line 2—2, Fig. 1, and Fig. 3, is a plan view.

My invention comprises a substantially rectangular open base 1, provided at its corners with swiveling casters 2. Rising centrally from and attached to the base, is a frame 3, supported rigidly in position by braces 4. Centrally of the cross-member 5, of the frame 3, is a clamping member 6, having slots 7, through which is arranged to extend a screw or other device 8, carrying a winged nut 9, for locking the clamping member in position after adjustment to a wheel, the clamping member being preferably curved, as at 10, to conform to the curvature of a tire on a wheel and to more effectively hold the wheel on the base. The base is provided with a plurality of rails 11 and 12, on which are slidably mounted blocks 13 and 14, having oppositely inclining faces 15 and 16 respectively, for the accommodation of a wheel. Each of the blocks is provided with a plurality of straps 17 and 18, respectively, the ends of which are bent under the rails 11 and 12, to hold same in place thereon.

In practice, when a vehicle is elevated, the truck is moved in position, and the blocks 13 and 14, adjusted to bring them directly in contact with the underside of the wheel. Thereupon, the clamping member 6, is brought to bear upon the upper part of the wheel, and locked by the adjustment nut 9. After removal of the necessary parts, which hold the wheel on the axle, the truck is moved away, carrying with it the wheel, which remains in the same position in which it was when removed from the axle, thereby obviating the trouble attendant upon the removal and replacement of a heavy wheel, and preventing accumulation of dirt and grit in and around the hub, as is frequently the case when the wheel is laid down.

What I claim, is:—

1. A truck comprising a base having casters, a vertical frame on said base, slidable means on said base to support a wheel, and adjustable means on said frame coöperating with said slidable means to hold a wheel.

2. A truck comprising a base having casters, and a plurality of rails, a vertical frame mounted on said base, a clamping member on said frame, and slidable means on said rails coöperating with said clamping member to hold a wheel.

3. A truck comprising a base having casters and a plurality of rails, a plurality of wheel supporting blocks slidable on said rails, a vertical frame mounted on said base, and a wheel clamping member on said frame coöperating with said blocks to hold a wheel.

4. A truck comprising a base having casters and a plurality of rails, a plurality of wheel supporting blocks slidable on said rails and having oppositely inclining faces, a vertical frame mounted on said base, and an adjustable wheel clamping member on said frame coöperating with said blocks to hold a wheel.

5. A truck comprising a base having casters, and a plurality of rails, a plurality of wheel supporting blocks slidable on said rails, and having oppositely inclining faces, a vertical frame mounted on said base, and an adjustable clamping member centrally of the cross member of said frame and coöperating with said blocks to hold a wheel.

In testimony whereof I affix my signature in the presence of two witnesses.

HARVEY P. SIBERELL.

Witnesses:
HENRY E. STORRS,
ANTON GLATZNER, Jr.